March 15, 1927. 1,621,000
J. C. CROWLEY
METHOD AND APPARATUS FOR VULCANIZING RUBBER PACKING UPON
A CYLINDRICAL ARTICLE
Filed Dec. 4, 1924 2 Sheets-Sheet 1

Inventor
John C. Crowley
By Thurston Rives & Hudson
Attorneys

March 15, 1927.  1,621,000
J. C. CROWLEY
METHOD AND APPARATUS FOR VULCANIZING RUBBER PACKING UPON
A CYLINDRICAL ARTICLE
Filed Dec. 4, 1924  2 Sheets-Sheet 2

Inventor
John C. Crowley
By Thurston Kwis & Hudson
Attorneys

Patented Mar. 15, 1927.

1,621,000

UNITED STATES PATENT OFFICE.

JOHN C. CROWLEY, OF CLEVELAND, OHIO, ASSIGNOR TO THE DILL MANUFACTURING COMPANY, OF CLEVELAND, OHIO, A CORPORATION OF OHIO.

METHOD AND APPARATUS FOR VULCANIZING RUBBER PACKING UPON A CYLINDRICAL ARTICLE.

Application filed December 4, 1924. Serial No. 753,862.

The present invention relates to a method and apparatus for vulcanizing a rubber packing upon a barrel-like object. The method and apparatus are particularly applicable for vulcanizing a rubber packing ring upon the outside of a cylindrical barrel forming a part of valve insides for use in the valve stems of pneumatic tires and similar devices, but there are certain features of the invention which are not limited to the precise use to which it is put.

The object of the invention is to provide an efficient method and one which can be carried on at low cost, and which will further provide a satisfactory way of disposing of the flash of rubber which ordinarily attaches to the part vulcanized on the cylindrical object, thus doing away with the necessity of a subsequent operation for the removal of the rubber flash.

Figure 1:
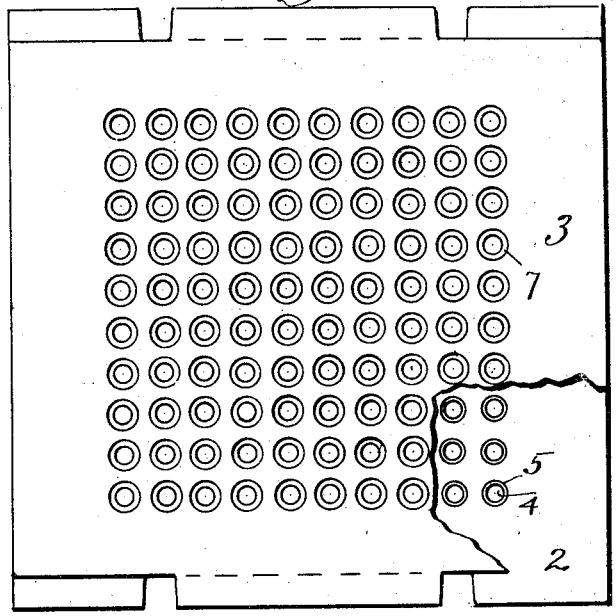
Figure 2:
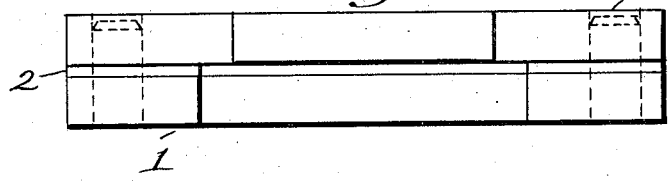
Figure 3:
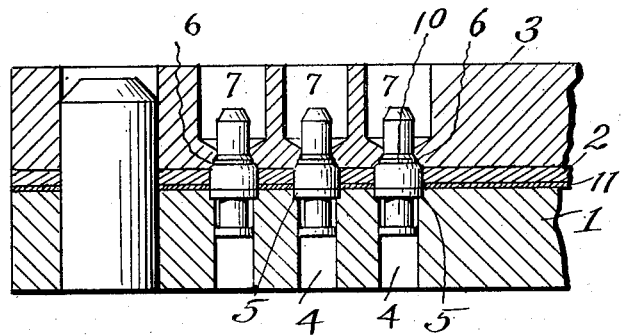
Figure 4:
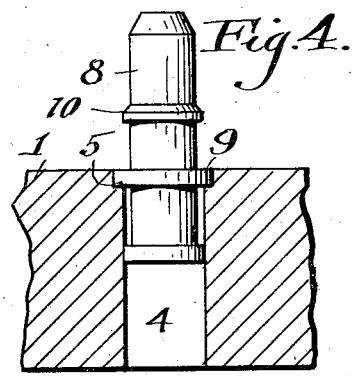
Figure 5:
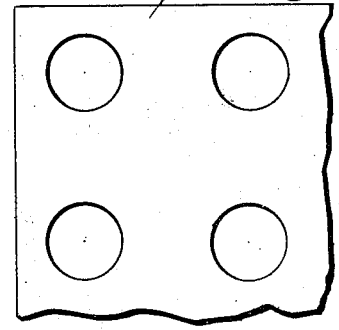
Figure 6:
Figure 7:
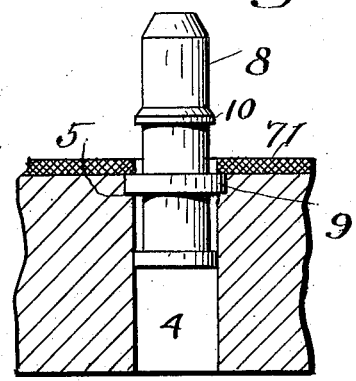
Figure 8:
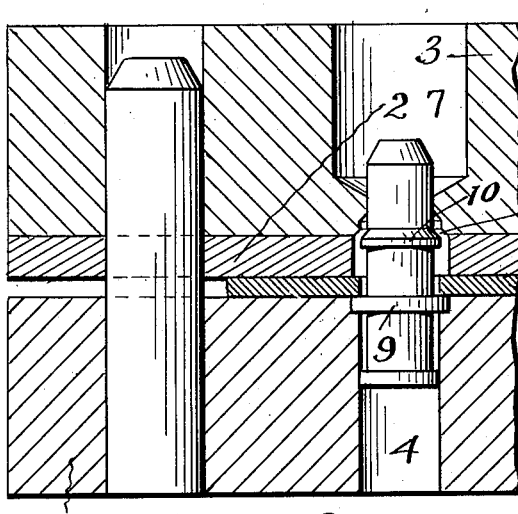
Figure 9:
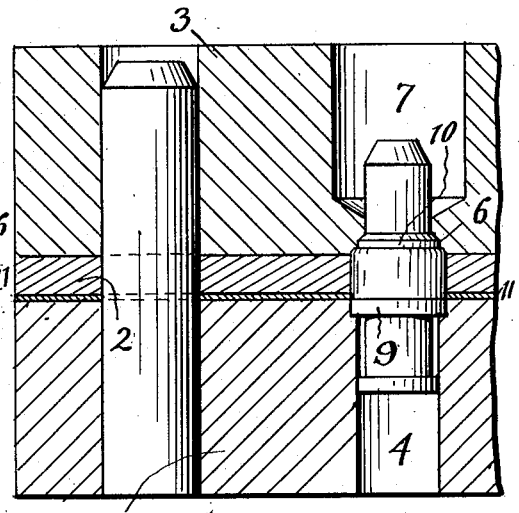
Figure 11:
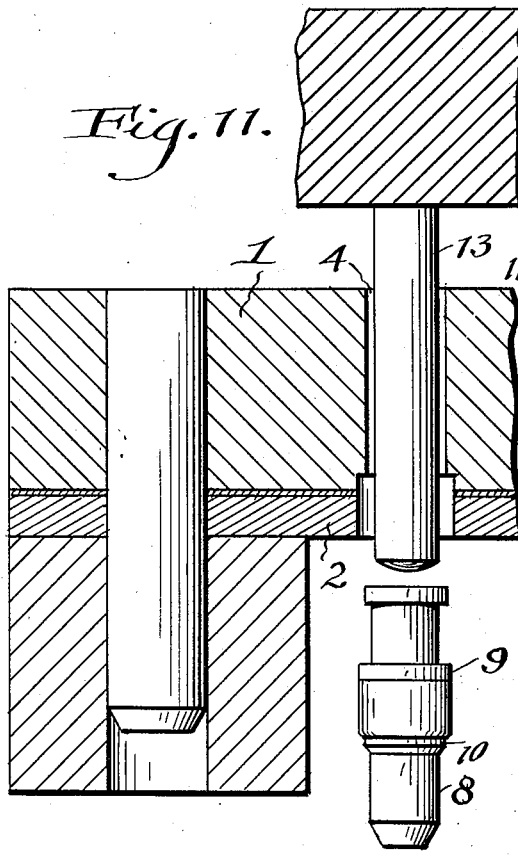
Figure 10:
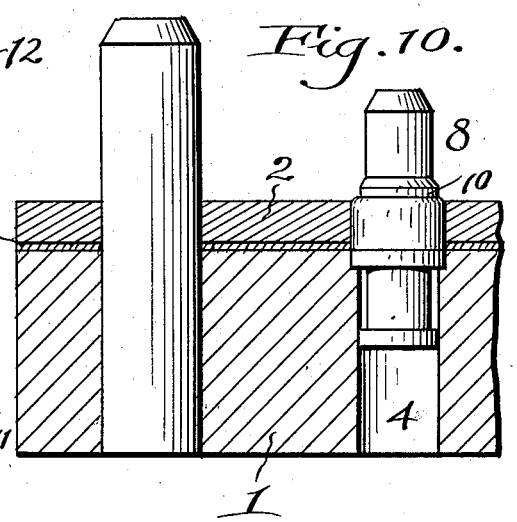

Reference should be had to the accompanying drawings forming a part of this specification, in which Fig. 1 is a top plan view of a mold; Fig. 2 is an end elevation of the mold shown in Fig. 1; Fig. 3 is a transverse section of a portion of the mold shown in Fig. 1; Fig. 4 is a sectional elevation of a mold with a cylindrical barrel in place; Fig. 5 is a top plan view, and Fig. 6 is a sectional view of a rubber sheet with holes punched through it; Fig. 7 is a sectional elevation showing a rubber sheet in place with the mold and surrounding the cylindrical barrel; Fig. 8 is a sectional elevation of a portion of the mold showing the barrel, rubber sheet, and parts of the mold in position before pressure; Fig. 9 is a sectional elevation showing the mold parts with the rubber and cylindrical body in place with the mold parts under pressure; Fig. 10 is a sectional elevation with portions of the mold removed, after the vulcanizing operation; Fig. 11 is a sectional elevation showing a portion of the mold with an instrument for removing the barrels with the vulcanized rubber in place from the mold.

Referring to the drawings, it may be stated that the mold consists of three parts, the lower section 1, an intermediate thin section 2, and an upper mold section 3. The lower mold section 1 is provided with a series of holes drilled through the same which are indicated at 4, and adjacent the upper portion of these holes the diameter is increased as is indicated at 5. There is, therefore, a shoulder formed at the upper end of each of the openings 4. The intermediate mold section 2 is a plate which is formed with a number of holes or openings through it corresponding to the number of openings 4 in the lower mold section, and when the plate 2 is assembled with respect to the mold section the openings in the plate 2 will register with the openings in the mold section 3. The diameter of the openings in the plate 2 are the same as the diameter of the enlarged portions 5 of the openings 4 in the lower section 1.

The mold section 3 is provided with a plurality of recesses in the under face thereof, as indicated at 6, these recesses corresponding with a shoulder which is formed on the barrel of the valve insides upon which the rubber packing is to be molded in position. There is also an opening 7 adjacent each portion 6 of the mold section 3 through which the upper end of the valve insides may extend.

It will, of course, be understood that suitable means are provided for properly aligning the various sections of the mold with respect to each other, and means for holding the various mold sections clamped together during the vulcanizing operation.

In performing the various operations in the molding of the rubber on the valve insides we would refer to Figs. 4 to 11 inclusive.

Referring to Fig. 4 the lower section of the mold is shown, and the barrel of a valve insides designated by the reference numeral 8 is shown in position in the mold. The barrel of the valve insides has a flange 9 which seats into the recess 5, and is supported upon the shoulder formed at the base of this recess. There is also another shoulder 10 formed on the barrel of the valve insides to which reference will later be made.

The mold section 1, as will be understood, is provided with a plurality of openings such as described, and in these openings throughout the extent thereof in the mold section the barrels for the valve insides will be mounted as indicated in Fig. 4. A sheet of unvulcanized rubber, such as indicated at 11 is provided with a number of spaced punched out portions circular in outline, and these are so positioned that the sheet of rubber may be overlaid upon the section 1 of the mold so that there will be a portion of rubber surrounding each barrel as indicated in Fig. 7. The rubber will extend slightly over the shoulder 9 as clearly shown in the drawing. After this the plate 2 is assembled and superimposed above the rubber sheet, and after that the top section 3 of the mold is superimposed upon the plate 2.

It will be seen that the plate 2 and the section of the mold indicated at 6, as shown in Fig. 8, provide a cavity around the barrel, thus providing a place for the rubber to flow when the mold sections are placed under pressure, as is shown in Fig. 9. When the pressure is applied the sheet of rubber between the mold sections 1 and 2 is squeezed into a thin sheet and the rubber will flow, as it were, into the cavity surrounding each barrel, and will occupy all the space between the shoulders 9 and 10.

It will be observed that when the mold sections are squeezed together the upper mold section will move down so that the recess co-operating with each barrel will closely engage with the shoulder 10, thus preventing any further upward movement of the rubber and effectually confining the same between the shoulders 9 and 10 on the barrel.

With the mold sections so clamped together the rubber is subjected to a vulcanizing action so that the rubber surrounding the barrel is vulcanized in position upon the barrel of the valve insides.

If the mold sections were removed and the barrels taken out, there would be a certain amount of rubber adhering to each of the vulcanized rubber portions on the barrels, because the thin sheet of rubber between the mold plates would be vulcanized, and it would be necessary to resort to some method for removing this flash, as it is called.

It has been found that this may be accomplished in a very satisfactory manner by the following method: The top mold section 3 is removed, (as shown in Fig. 10, and then the mold sections 1 and 2 are inverted upon a suitable jig as indicated in Fig. 11, and so positioned that a head 12 formed with a plurality of plungers 13 may descend through each of the openings 4 in the mold section 1, and engage with the end of each of the barrels which are in the mold pushing them outwardly. By doing this the edge of each opening in the plate 2 forms a die and the shoulder 9 acts as a punch so that as each barrel is pushed outwardly it shears the rubber flash and there is a clear line of separation so that each barrel emerges from the mold with the rubber packing ring clean and free from rough edges.

Having described my invention, I claim:—

1. The method of forming a rubber packing on a cylindrical member provided with a groove which consists in placing the cylindrical member in a mold, surrounding the groove in the cylindrical member with a part forming a definite confining chamber, forcing unvulcanized rubber into the groove and confined by the said mold part, vulcanizing the rubber while in place, and after vulcanization ejecting the cylindrical member from the mold with the mold part which has confined the rubber in the groove acting as a die to shear any rubber which adheres to the part molded in the groove in the cylindrical member.

2. The method of forming a rubber packing on a cylindrical member which is provided with a groove between two shoulders which consists in placing the said cylindrical member in a mold, and providing a part which surrounds the groove which part has an opening of the same diameter as one of the shoulders on the cylindrical member, forcing unvulcanized rubber into the groove and into the chamber formed by the mold part surrounding the groove, then vulcanizing the rubber in position, then in ejecting the cylindrical member from the mold so that one of the shoulders co-operates with the opening in the mold part which surrounds the groove in the cylindrical member the mold part acting as a die and the shoulder on the cylindrical member acting as a punch thereby to sever any flash of rubber which may adhere to the rubber vulcanized in the groove on the cylindrical member.

3. The method of vulcanizing rubber in position upon a cylindrical article which consists in providing a mold part in which one end of the cylindrical article is mounted, providing a sheet of rubber which has an opening in it slightly greater than the diameter of the portion of the cylindrical article at which the rubber is to be molded and placing said sheet of rubber on the first mentioned part with the opening surrounding the cylindrical member, then providing a second mold part which has a substantially cylindrical opening surrounding the cylindrical article and superimposed upon the sheet of rubber, then providing a third mold part which has an opening that closely fits the extending end of the cylindrical article, then compressing the mold parts so that the rubber in the sheet of rubber flows into the cavity formed in the second mentioned mold part and surrounds a portion of the cylindrical article, then vulcanizing the article with the mold under compression.

4. The method of vulcanizing a rubber packing in a groove upon a cylindrical member which consists in providing a mold part in which one end of the cylindrical member is mounted, then providing a sheet of rubber having a substantially circular opening therethrough and placing the rubber sheet upon the first mentioned mold member with the opening surrounding a portion of the groove in the cylindrical article, then providing a mold plate having a substantially circular opening which is slightly greater in diameter than the diameter of the groove in the article, then providing a mold part which has an opening that closely fits upon the extending end of the cylindrical article, then compressing the mold parts so that the rubber sheet is compressed and the rubber forced into the groove of the cylindrical article and confined by the opening in the second mentioned mold part, and vulcanizing the rubber while the mold parts are under pressure.

5. A mold for vulcanizing rubber in position upon a cylindrical article comprising a mold part having an opening therethrough into which one end of the article to be vulcanized is supported, a second mold part having a circular opening which is of substantially the same diameter as the opening in the first mentioned mold part, a third mold part which is adapted to be superimposed upon the second mold part which part has an opening through which the cylindrical article may extend when in position.

6. A mold in which rubber may be vulcanized upon a cylindrical article comprising a mold member having an opening which has a shoulder for supporting the said cylindrical article, a plate provided with a circular opening which is of substantially the same diameter as the portion of the opening above the shoulder in the first mentioned mold member, a third mold part which has an opening adapted to closely fit the extending end of the cylindrical article.

In testimony whereof, I hereunto affix my signature.

JOHN C. CROWLEY.